US005751477A

United States Patent [19]

Tomita et al.

[11] Patent Number: 5,751,477

[45] Date of Patent: May 12, 1998

[54] TRANSFERRING DEVICE

[75] Inventors: Mihoko Tomita; Michihiro Kozuka, both of Tokyo, Japan

[73] Assignee: Tomy Company, Ltd., Tokyo, Japan

[21] Appl. No.: 528,262

[22] Filed: Sep. 14, 1995

[30] Foreign Application Priority Data

Sep. 16, 1994 [JP] Japan .................................... 6-012634

[51] Int. Cl.$^6$ .................................................... G03B 21/56

[52] U.S. Cl. ................................ 359/447; 40/390; 40/492

[58] Field of Search ............................... 359/447; 40/390, 40/492

[56] References Cited

U.S. PATENT DOCUMENTS

| | | | |
|---|---|---|---|
| 1,420,491 | 6/1922 | Morse . | |
| 1,518,680 | 12/1924 | Arnot . | |
| 1,946,837 | 10/1934 | Clayton . | |
| 2,505,116 | 4/1950 | Hitchings | 40/102 |
| 3,274,715 | 9/1966 | Jansser | 40/102 |
| 3,291,552 | 12/1966 | Hoggan . | |
| 3,693,580 | 9/1972 | Thierer | 116/134 |
| 4,191,450 | 3/1980 | Hoggan | 350/121 |
| 4,670,076 | 6/1987 | Davies | 156/244.11 |
| 5,388,530 | 2/1995 | Jacobus | 108/143 |

FOREIGN PATENT DOCUMENTS

| | | |
|---|---|---|
| 0 099 972 | 2/1984 | European Pat. Off. . |
| 0 535 912 | 4/1993 | European Pat. Off. . |
| 27 04 395 | 8/1978 | Germany . |
| 1444556 | 8/1976 | United Kingdom . |
| 2023509 | 1/1980 | United Kingdom . |
| 2294241 | 4/1996 | United Kingdom . |

*Primary Examiner*—Daniel P. Malley
*Attorney, Agent, or Firm*—Staas & Halsey

[57] ABSTRACT

A transferring device is disclosed consisting of a plate for supporting an original paper, a transparent window plate for reflecting an image of the original paper and which is supported on the supporting plate, a base plate supporting the supporting plate and window plate and mechanism for erecting the supporting plate and the window plate at predetermined angles wherein a pattern of the original paper is transferred onto a paper located on the rear face of the window plate by tracing the reflected image from the front face of the window. The supporting plate, the window plate and the base plate are connected through hinges permitting opening and closing, respectively. The window plate and the base plate are provided with a first engaging mechanism for erecting the supporting plate at a predetermined angle with respect to the base plate. The window plate and the base plate are provided with a second engaging mechanism for erecting the window plate at a predetermined angle with respect to the base plate.

8 Claims, 5 Drawing Sheets

TRANSFERRING DEVICE

BACKGROUND AND SUMMARY OF THE INVENTION

The present invention relates to a device with special appeal to children whereby a pattern may be transferred from an original rendering to another medium, for example, from a magazine to a blank piece of paper.

U.S. Pat. No. 3,819,251 is exemplary of prior transferring mechanisms and features double clips for positioning and holding the supporting plate and window plate in their desired position. With such a double clip construction the supporting plate and the window plate protrude a substantial distance out of the base plate when the device is stowed away during non-use. Removal of the supporting plate and window plate from the clips is therefore required as a practical matter. This means that when the transferring device is used once again the supporting plate and the window plate must be attached to the clips. In addition, in prior art transferring devices such as noted above, a fixing member and a clamping member in the form of clips are fixedly disposed on the base plate and also protrude therefrom a considerable distance, such that it is hard to package and store away the unit.

In contrast, in the transferring device of the present invention, the supporting plate, the window plate and the base plate are connected through hinges permitting opening and closing of the support plate and the window plate when not in use. An automatic engaging mechanism is employed to raise and hold the supporting plate and window plate when in use. In the manner the transferring device of the present invention may be easily folded as a unit and stored for future use.

DESCRIPTION OF THE PREFERRED EMBODIMENT

Figure 1:
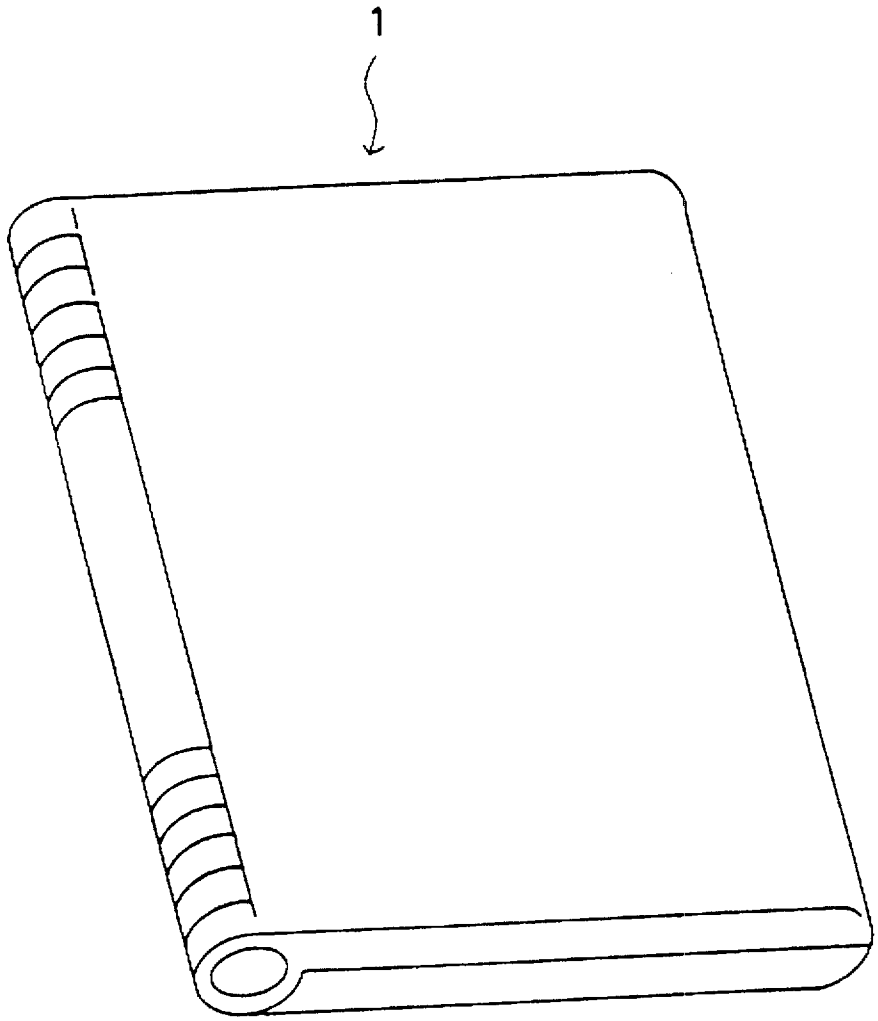
FIG. 1 is a perspective view of the transferring device of the present invention with the supporting and window plates folded in closed position.
Figure 2:
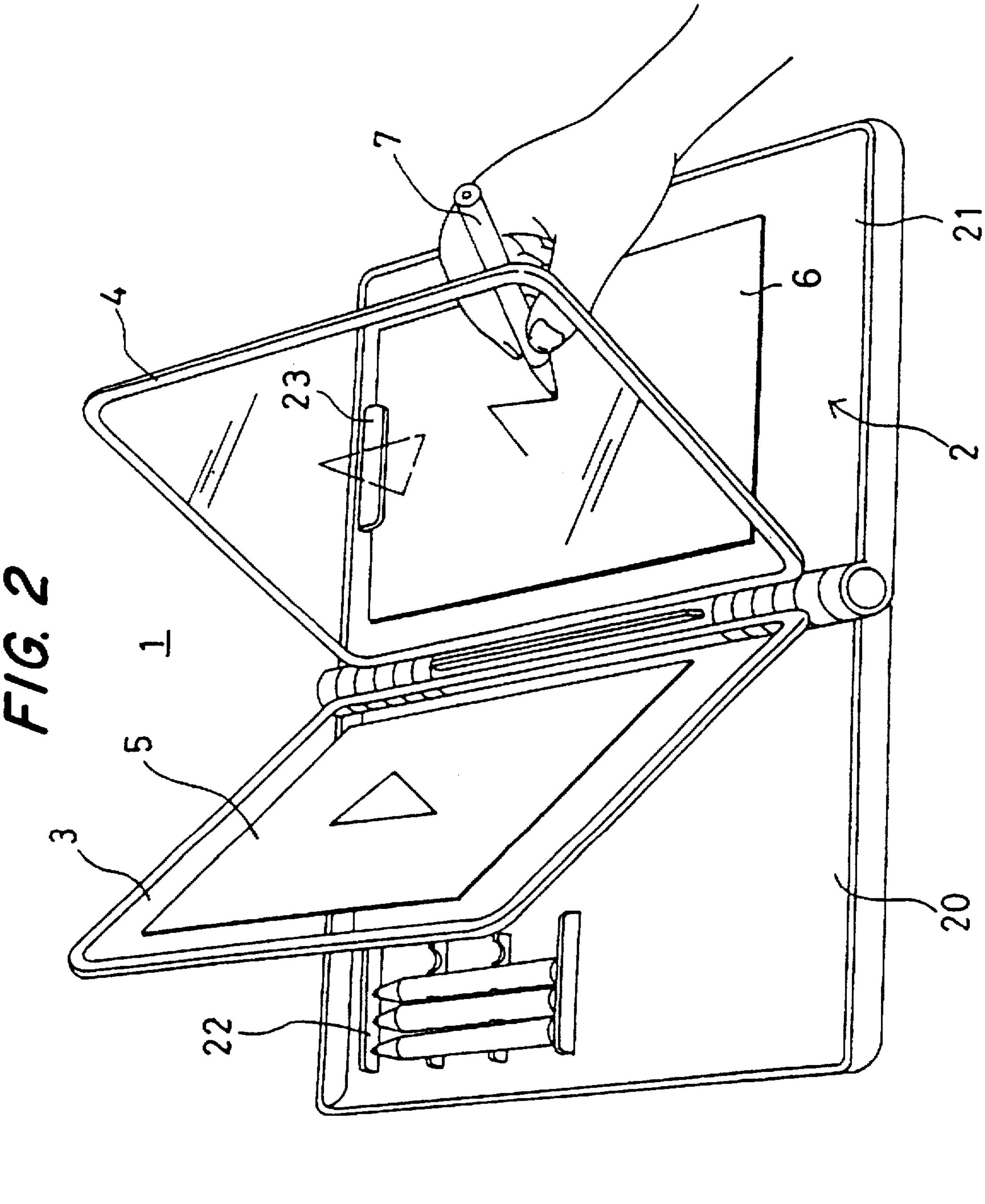
FIG. 2 is a perspective view of the transferring device with the supporting and window plates in open position illustrating usage thereof.

The transferring device of the present invention is generally depicted in FIGS. 1 and 2 and consists of a base plate 2, a supporting plate 3 and a window plate 4 movably mounted about hinges. It will be apparent from FIG. 2 that the transferring device of the present invention is configured as a book. The book is in closed position in FIG. 1 and in open position in FIG. 2. In accordance with the present invention, the pattern of the original paper 5 is adapted to be transferred onto the paper 6 by mounting the original paper 5 on the surface of the supporting plate 3 while mounting blank paper 6 on the base plate 2 and thereafter tracing the image that is reflected at the rear face of the window plate with the writing instrument 7 while looking at the image of the original plate 5 which is reflected on the surface of the window plate 4. It will be apparent that the pattern transferred on the paper 6 is the reverse of the pattern on the original paper 5.

As seen in FIG. 2, the base plate 2 rotatably mounts the supporting plate 3 and the window plate 4 while covering same in the same manner that the covers of a book cover the pages thereof. The base plate 2 consists of left and right cover bodies 20 and 21. There is further provided a holder 22 on the inner face of the left cover body 20 for the various writing instruments such as pencils and ball-point pens 7.

Figure 3A:
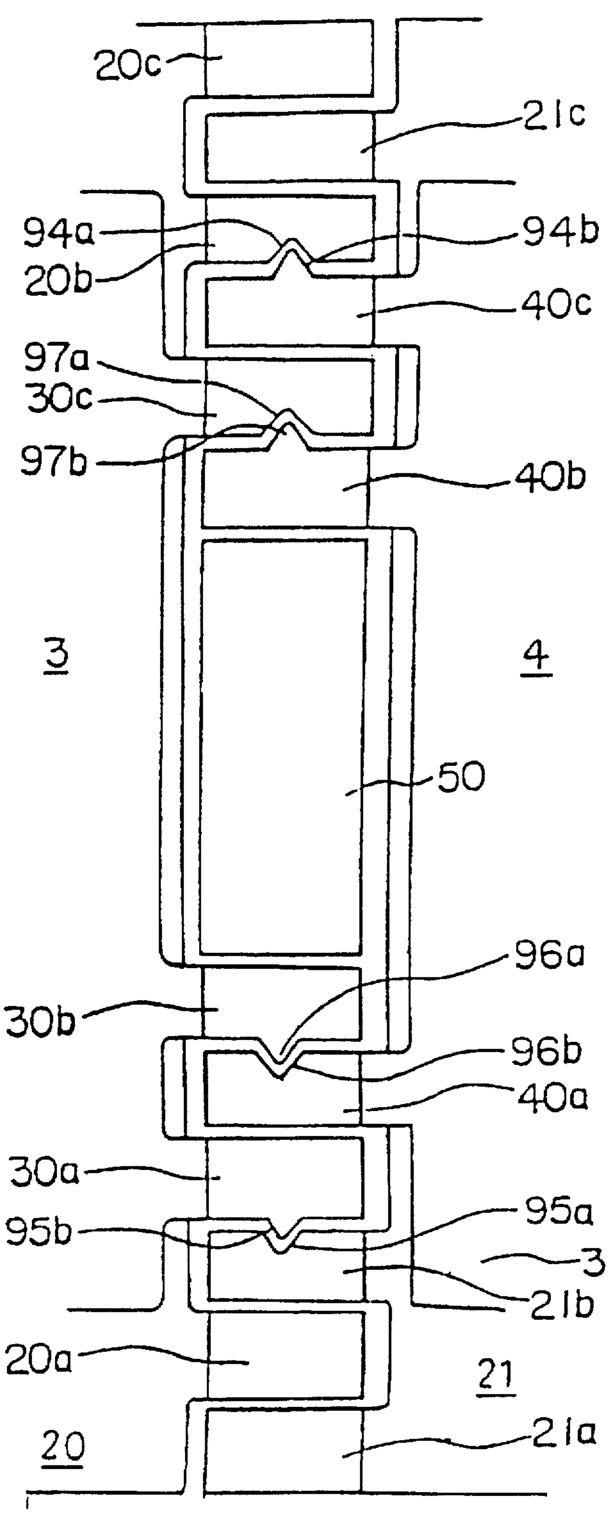
FIG. 3A is a plan view of the hinge connection portion.

Clips 23, for holding the blank paper 6, is positioned on the inner face of the right cover body 21. Moreover, the cover bodies 20 and 21 are each provided with knuckles **20*a*, 20*b* and 20*c* and 21*a*, 21*b* and 21*c*, respectively, as seen in FIG. 3A. These knuckles are connected by hinges at portions thereof between the supporting plate 3 and the window plate 4. When the cover bodies 20 and 21 are in closed position as seen in FIG. 1 the supporting plate 3 and the window plate 4 are conveniently stored within the cover bodies 20 and 21**.

The supporting plate 3, which mounts the original paper 5, is made of a hard resin and is provided with knuckles **30*a*, 30*b*, and 30*c* at the end thereof as seen in FIG. 3A. The supporting plate 3 is therefore connected through hinges to the cover bodies 20 and 21 and the window plate 4** by the action of the above-described knuckles.

The window plate 4 is made of a hard resin and, moreover, is provided with knuckles **40*a*, 40*b*, and 40*c* at the base end thereof as seen in FIG. 3A. The window plate 4 is connected through hinges with the cover bodies 20 and 21 and the supporting plate 3** by the action of the above-described knuckles.

The window plate 4 is transparent and functions as a half-mirror optical element. More specifically, the window plate 4 is adapted to reflect the reflected image on the original paper 5 mounted on the surface of the supporting plate 3 and also to permit one to see the rear side of the window plate 4.

Figure 3B:
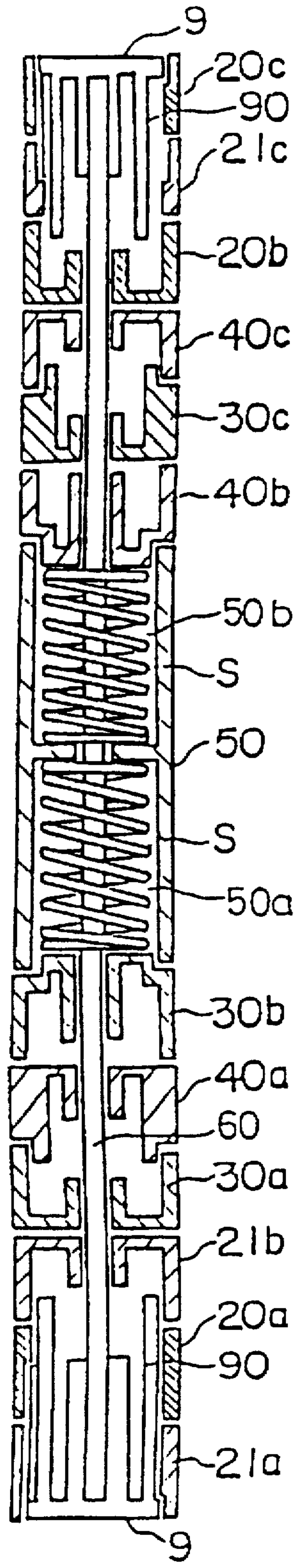
FIG. 3B is a cross sectional view of the hinge connection portion.

The construction of the hinged arrangement between the cover plates 20 and 21, the supporting plate 3 and the window plate 4 will now be described with reference to FIGS. 3A and 3B. It will be apparent that there is provided at the center a "floating" knuckle 50, which is not a part of the cover plates 20 and 21, the supporting plate 3, the window plate 4 and the knuckles respectively associated therewith. The knuckle 50 is positioned such that the knuckles **21*a*, 20*a*, 21*b*, 30*a*, 40*a* and 30*b* are arranged in order, whereas on the opposite side of the floating knuckle 50 the knuckles 40*b*, 30*c*, 40*c*, 20*b*, 21*c* and 20*c* are arranged in order. These knuckles are provided with ribs and bosses. See FIGS. 4–5. Spring chambers 50*a* and 50*b* are formed inside the floating knuckle 50, as seen in FIG. 3B, and are separated by a center rib such that the spring chambers 50*a* and 50*b* are inserted within the coil springs S, respectively. A shaft 60 passes through the knuckles, such that the cover bodies 20 and 21, the supporting plate 3 and the window plate 4 are connected through the hinges and thus capable of being opened and closed. It will be apparent that the supporting plate 3 is urged toward one side and the window plate 4** is urged toward the opposite side by the coil springs S.

Figure 4:
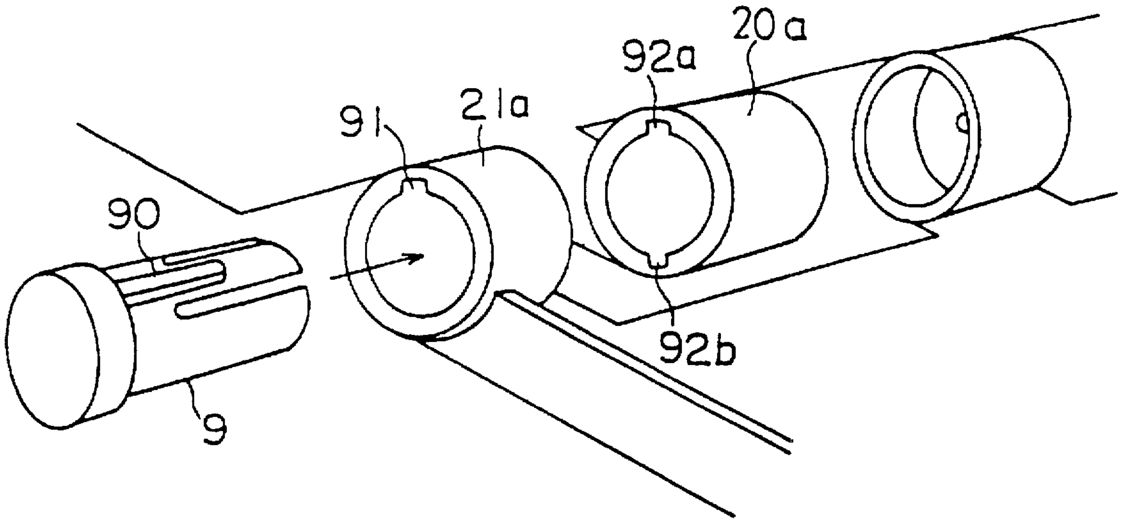
FIG. 4 is an exploded perspective view of an end of the hinge connection.
Figure 5:
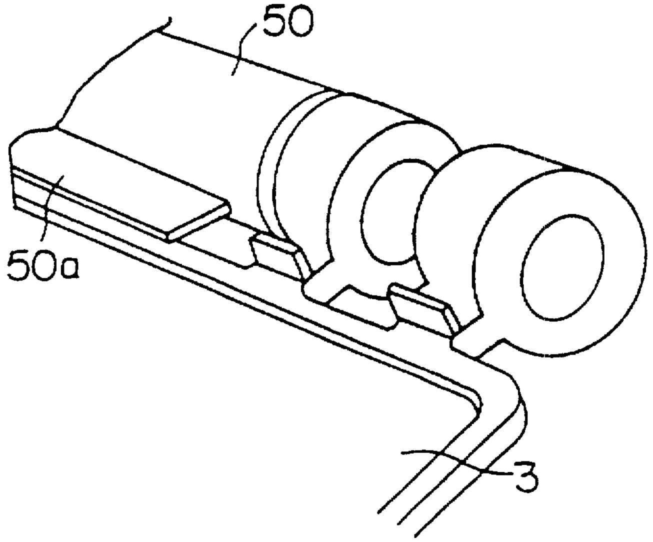
FIG. 5 is a perspective view of an element of the hinge connection.

The positioning mechanism disposed on the transferring device of the present invention will now be described. As seen in FIG. 3B, a locking cap 9, which acts to position the cover bodies 20 and 21 while preventing exposure of the shaft 60, is provided with a resilient protrusion 19. The first knuckle 21*a* is provided with a gutter 91, as seen in FIG. 4, which is arranged to accommodate the resilient protrusion 90. The second knuckle 20*a* is provided with gutters 92*a* and 92*b* which are arranged to accommodate the leading side portion of the resilient protrusion 90. The gutters 92*a* and 92*b* are disposed on the inner face of an opening of the knuckle 20*a* at opposite positions. The locking cap 9 is adapted to fit inside the knuckles 21*a* and 20*a*, and the resilient protrusion 90 is fitted within the gutter 91 of the knuckle 21*a* at the base end side thereof. The resilient protrusion 90 of the locking cap 9 is fitted within the gutter 92*a* of the knuckle 20*a* at the leading end thereof when the cover bodies 20 and 21 are opened, and is disengaged from the gutter 92*a* of the knuckle 20*a* and fitted to the gutter 92*b* of the knuckle 20*a* when the cover bodies 20 and 21 are closed. In this manner proper positioning between the cover bodies 20 and 21 is accomplished. This same positioning mechanism is disposed on the end portion of the hinge connection portion.

Figure 6:
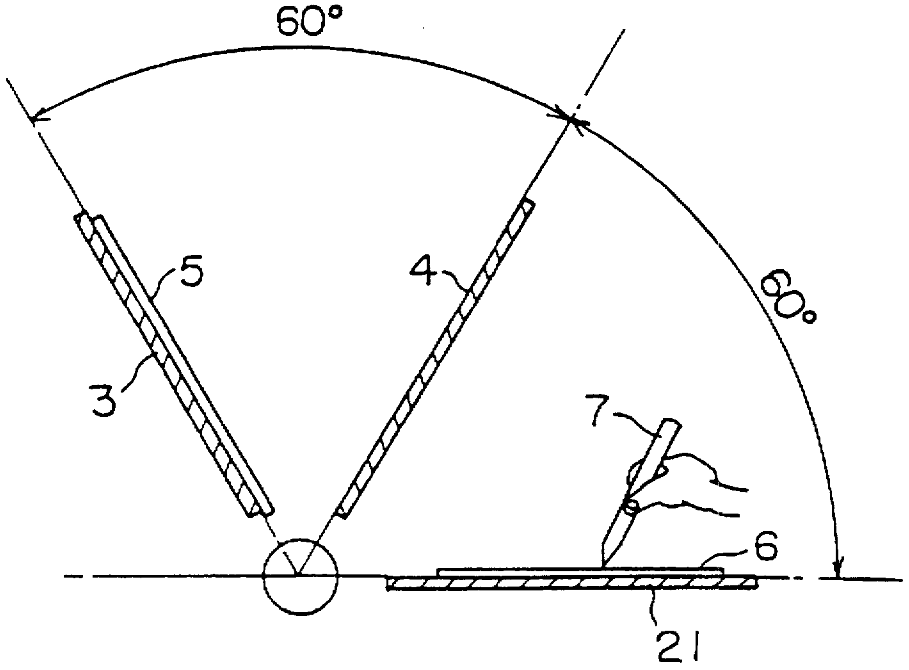
FIG. 6 is a schematic view illustrating the angular relationship between the supporting plate and the window plate when the transferring device of the present invention is in use.

As seen in FIG. 3A, there are provided a concave portion 94*a* and a convex portion 94*b*, engaged with each other, on the knuckle 20*b* of the cover body 20 and the knuckle 40*c* of the window plate 4. The concave portion 94*a* and the convex portion 94*b* function as an engaging mechanism for holding the window plate 4 at an angle of 60° (see FIG. 6) with respect to the cover body 21 in association with the coil spring S as seen in FIG. 3B. In addition, concave portion 95*a* and convex portion 95*b*, engaging each other, are disposed on the knuckle 21*b* of the cover body 21 and the knuckle 30*a* of the supporting plate 3. The concave portion 95*a* and the convex portion 95*b* function as an engaging mechanism for holding the supporting plate at an angle of 60° with respect to the cover body 20, in association with the coil spring S. Furthermore, there are provided a convex portion 96*a* and a concave portion 96*b*, engaged with each other, on the knuckle 30*b* of the supporting plate 3 and the knuckle 40*a* of the window plate 4. Still further, a concave portion 97*a* and a convex portion 97*b*, engaged with each other, are disposed on the knuckle 30*c* of the supporting plate 3 and the knuckle 40*b* of the window plate 4. These concave portions 96*b*, 97*a*, and convex portions 96*a* and 97*b* function as an engaging mechanism holding the supporting plate 3 and the window plate 4 at an angle of 60° in association with the coil spring S.

The floating knuckle 50 is provided with a pressing element 50*a* for pressing the original paper 5 at the circumferential face thereof. That is, the pressing element 50*a* presses the original paper 5 by rotating the floating knuckle 50 around the shaft 60, after the original paper 5 is disposed on the supporting plate 3.

From the foregoing it will be apparent that the supporting plate 3 and the window plate 4 are positioned at 60° with respect to the cover bodies 20 and 21. In this manner special fittings to keep the supporting plate 3 and window plate 4 at predetermined angles are not required. Moreover, in accordance with the principles of the present invention, the supporting plate 3 and the window plate 4 are able to be folded directly against the cover bodies 20 and 21 when the transferring device is not in use, in this manner permitting the disassembly of the components rapidly for storage and transportation.

It will be apparent that the principles of the present invention may be performed by embodiments not specifically disclosed in the specification and that the structures disclosed herein can be modified without departing from the spirit of the invention. A few examples follow.

We claim:

1. A transferring device, comprising:

a base, a supporting plate, a transparent window plate, hinge means operatively connecting the supporting plate, the window plate and the base permitting opening and closing movement therebetween, first engaging means for erecting the supporting plate at a predetermined angle with respect to the base, and second engaging means for erecting the window plate at a predetermined angle with respect to the base, the base being formed of a pair of cover bodies movable between first and second positions such that in the first position, the cover bodies lie in a common plane, with the supporting plate and the window plate on one side of the common plane and in the second position, the cover bodies are folded on top of one another so as to enclose the supporting plate and the window plate.

2. A transferring device comprising:

a supporting plate for supporting an original paper, a transparent window plate for reflecting at a surface thereof the reflected image of the original paper, a base plate supporting the supporting plate and the window plate such that a pattern of the original paper is transferred onto a blank paper positioned on the base plate by tracing the reflected image from the front face of the window, hinges connecting the supporting plate, the window plate and the base plate permitting opening and closing of same, a first engaging device for positioning the supporting plate at a predetermined angle with respect to the base plate, and a second engaging device for positioning the window place at a predetermined angle with respect to the base plate, the base plate being formed of a pair of cover bodies movable between first and second positions such that in the first position, the cover bodies lie in a common plane, with the supporting plate and the window plate on one side of the common plane, and in the second position, the cover bodies are folded on top of one another so as to enclose the supporting plate and window plate.

3. A transferring device according to claim 1, wherein the hinge means connecting the supporting plate, the window plate and the base comprise knuckles provided on each of the supporting plate, the window plate and the base, and a shaft passing through the knuckles;

the first engaging means comprises one of a concave and a convex portion provided on the supporting plate and the other of the concave and convex portion provided on the base plate or the window plate, the concave and convex portions of the first engaging means being urged together; and the second engaging means comprises one of a concave and a convex portion provided on the window plate and the other of the concave and convex portion provided on the supporting plate or the base, the concave and convex portions of the second engaging means being urged together.

4. A transferring device according to claim 3, wherein the shaft passes through a floating knuckle not attached to any of the supporting plate, the window plate and the base, the floating knuckle having spring chambers with coil springs therein, the coil springs urging together the concave and convex portions respectively of the first and second engaging means.

5. A transferring device according to claim 1, wherein the hinge means connects the supporting plate, the window plate and the base with a shaft, the transferring device further comprising a floating knuckle, not attached to any of the supporting plate, the window plate and the base plate, the shaft of the hinge means passing through the floating knuckle, the floating knuckle having a pressing element extending therefrom with the pressing element being movable to press against the supporting plate.

6. A transferring device according to claim 3, wherein the hinges connecting the supporting plate, the window plate and the base plate comprise knuckles provided on each of the supporting plate, the window plate and the base plate, and a shaft passing through the knuckles;

the first engaging means comprises one of a concave and a convex portion provided on the supporting plate and the other of the concave and the convex portion provided on the base plate or the window plate, the concave and convex portions of the first engaging means being urged together; and second engaging means comprises one of a concave and a convex portion provided on the window plate and the other of the concave and the convex portion provided on the supporting plate or the base plate, the concave and convex portions of the second engaging means being urged together.

7. A transferring device according to claim 6, wherein the shaft passes through a floating knuckle not attached to any of the supporting plate, the window plate and the base plate, the floating knuckle having spring chambers with coil springs therein, the coil springs urging together the concave and convex portions respectively of the first and second engaging means.

8. A transferring device according to claim 2, wherein the hinges include a shaft connecting the supporting plate, the window plate and the base plate, the transferring device further comprising a floating knuckle not attached to any of the supporting plate, the window plate and the base plate, the shaft of the hinges passing through the floating knuckle, the floating knuckle having a pressing element extending therefrom with the pressing element being movable to press against the supporting plate.

* * * * *